(12) United States Patent
Franken et al.

(10) Patent No.: US 10,190,029 B2
(45) Date of Patent: Jan. 29, 2019

(54) REMOVABLE POLYURETHANE HOT MELT ADHESIVE AND THE USE THEREOF

(71) Applicant: Henkel AG & Co. KGaA, Duesseldorf (DE)

(72) Inventors: Uwe Franken, Dormagen (DE); Claudia Meckel-Jonas, Duesseldorf (DE); Hongxia Zhao, Shanghai (CN); Yang Cao, Shanghai (CN); Xiao Han, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/384,402

(22) Filed: Dec. 20, 2016

(65) Prior Publication Data

US 2017/0101565 A1 Apr. 13, 2017

Related U.S. Application Data

(63) Continuation of application No. PCT/CN2014/081482, filed on Jul. 2, 2014.

(51) Int. Cl.
| | |
|---|---|
| *C09J 175/08* | (2006.01) |
| *C08G 18/12* | (2006.01) |
| *C08G 18/20* | (2006.01) |
| *C08G 18/40* | (2006.01) |
| *C08G 18/42* | (2006.01) |
| *C08G 18/48* | (2006.01) |
| *C08G 18/76* | (2006.01) |
| *C08G 18/10* | (2006.01) |
| *C09D 175/06* | (2006.01) |
| *C09J 175/06* | (2006.01) |
| *C08L 23/08* | (2006.01) |
| *C08L 33/06* | (2006.01) |

(52) U.S. Cl.
CPC .......... *C09J 175/08* (2013.01); *C08G 18/10* (2013.01); *C08G 18/12* (2013.01); *C08G 18/20* (2013.01); *C08G 18/4018* (2013.01); *C08G 18/4211* (2013.01); *C08G 18/4238* (2013.01); *C08G 18/4833* (2013.01); *C08G 18/7671* (2013.01); *C08L 23/0869* (2013.01); *C08L 33/06* (2013.01); *C09D 175/06* (2013.01); *C09J 175/06* (2013.01); *C08G 2170/20* (2013.01); *C08G 2170/90* (2013.01); *C09J 2205/114* (2013.01); *Y02P 20/582* (2015.11)

(58) Field of Classification Search
CPC ........ C08G 18/10; C08G 18/12; C08G 18/20; C08G 18/289; C08G 18/302; C08G 18/4018; C08G 18/4211; C08G 18/4238; C08G 18/4833; C08G 18/7671; C08G 2170/20; C08G 2170/90; C08L 23/0869; C08L 33/06; C09D 175/06; C09J 175/06; C09J 175/08; C09J 2205/114
USPC .............. 528/59; 526/935; 428/423.1, 425.1, 428/425.6, 425.8, 425.9
See application file for complete search history.

(56) References Cited

U.S. PATENT DOCUMENTS

| | | |
|---|---|---|
| 5,021,507 A | 6/1991 | Stanley et al. |
| 8,933,163 B2 | 1/2015 | Krebs et al. |
| 9,670,391 B2 | 6/2017 | Kanagawa et al. |
| 2004/0106732 A1* | 6/2004 | Tsuji ..................... C08F 293/00 525/94 |
| 2004/0249076 A1* | 12/2004 | Slark .................. C08G 18/4063 525/123 |
| 2006/0084755 A1 | 4/2006 | Good et al. |
| 2014/0242323 A1* | 8/2014 | Giorgini ................. C08G 18/10 428/76 |
| 2016/0046846 A1* | 2/2016 | Das ........................ C08G 18/12 156/711 |

FOREIGN PATENT DOCUMENTS

| | | |
|---|---|---|
| CN | 103087669 A | 5/2013 |
| CN | 103102863 A | 5/2013 |
| CN | 103124756 A | 5/2013 |
| JP | S62119240 A | 5/1987 |
| JP | H05311145 A | 11/1993 |
| WO | 0181495 A2 | 11/2001 |
| WO | 2013061790 A1 | 5/2013 |
| WO | 2014015771 A1 | 1/2014 |

OTHER PUBLICATIONS

International Search Report for International PCT Patent Application No. PCT/CN2014/081482 dated Feb. 26, 2015.
DIN EN ISO 11357.
ISO 4625-1-2004.
EN ISO 2555.

\* cited by examiner

*Primary Examiner* — Thao T Tran
(74) *Attorney, Agent, or Firm* — James E. Piotrowski

(57) ABSTRACT

The invention relates to a polyurethane (PU) reactive hot melt adhesive removable at elevated temperature as well as having a high bonding strength at room temperature.

17 Claims, No Drawings

REMOVABLE POLYURETHANE HOT MELT ADHESIVE AND THE USE THEREOF

The invention relates to a polyurethane (PU) reactive hot melt adhesive removable at elevated temperature as well as having a high bonding strength at room temperature. In particular, the invention relates to a polyurethane reactive hot melt adhesive comprising a (meth)acrylate polymer and a isocyanate-functional polyurethane prepolymer, wherein the (meth)acrylate polymer has a melting point of from about 90 to about 140° C., and a number average molecular weight of from about 20000 to about 80000 g/mol.

In a variety of structural assembly applications, a significantly low bonding strength at an elevated temperature as well as a high bonding strength at room temperature between assembly parts are a long-felt need in the art to improve the assembly process efficiency and save cost.

For example, some substrate materials used for structural bonding are very expensive. In order to reuse the expensive materials from unqualified bonded substrates due to mistakes, the assembly parts are required to be separated without any damage of the expensive substrates. Afterwards, the adhesive residue should be fully cleaned from the substrates so that the substrates can be reused.

Traditional PU hot melt adhesives could offer favorable properties in long term, such as high final bonding strength, good aging performance as well as a proper open time. However, the bonding strength at high temperature over a certain time after final curing usually keeps so high level that it cannot meet the detachment demand. Accordingly, users are more and more hesitant to use PU hot melt adhesives in this field.

For example, US 2006/0084755 A1 discloses a hot melt adhesive composition comprising an isocyanate and a large range of block acrylic copolymers, wherein the isocyanate comprises either a polymeric isocyanate or an isocyanate-terminated prepolymer.

WO 01/81495 A2 discloses a solvent-free moisture curable one-part hot melt polyurethane adhesive or sealant composition which is solid at room temperature comprising a urethane prepolymer, a reactive hydroxyl containing or a nonreactive polymer and a thermoplastic resin.

At the same time, tapes are well-known because they are easily debonded and peeled off. However, the bonding strengths of tapes are in a quite low level, and thus cannot be compared with PU hot melt adhesives. Also, tapes are difficult in processing especially for narrow substrates.

As such, there is still a further need in the art for a polyurethane reactive hot melt adhesive removable at elevated temperature and having a high bonding strength at lower temperature.

The present invention is generally directed to, in one aspect, a reactive hot melt adhesive comprising a (meth)acrylate polymer and a isocyanate-functional polyurethane prepolymer, wherein the (meth)acrylate polymer has a melting point of from about 90 to about 140° C., and a number average molecular weight of from about 20000 to about 80000 g/mol.

Another aspect, provided herein is a cured adhesive obtained from the reactive hot melt adhesive as above.

Still another aspect, provided herein is a method of bonding materials together which comprises applying the reactive hot melt adhesive as above in a liquid form to a first substrate, bringing a second substrate in contact with the composition applied to the first substrate, and subjecting the adhesive to moisture which will allow the composition to cool and cure to a solid form.

Still another aspect, provided herein is the use of the reactive hot melt adhesive as above or the cured adhesive as above for bonding articles having substrates made of wood, metal, polymeric plastics, glass and textiles; in water towers, for bonding to exterior surfaces, in the manufacture of footwear, as a glazing compound in the manufacture of windows, in the manufacture of doors and architectural panels, and in the manufacture of handheld devices and displays (HHDD).

Other features and aspects of the subject matter are set forth in greater detail below.

The present invention relates to a reactive hot melt adhesive comprising a (meth)acrylate polymer and a isocyanate-functional polyurethane prepolymer, wherein the (meth)acrylate polymer has a melting point of from about 90 to about 140° C., and a number average molecular weight of from about 20000 to about 80000 g/mol.

The term "number average molecular weight" refers to a particular measure of the molecular weight of a polymer. The number average molecular weight is the common average of the molecular weights of the individual polymer molecules. It is determined by measuring the molecular weight of n polymer molecules, summing the weights, and dividing by n.

Polyurethane reactive hot melt adhesives have been widely used in the application of structural assembly. These adhesives consist primarily of isocyanate-functional polyurethane prepolymers that react with surface or ambient moisture in order to extent the backbone and thus form a polyurethane polymer. Isocyanate-functional polyurethane prepolymers are conventionally obtained by reacting diols with diisocyanates. Through the diffusion of moisture from the atmosphere or the substrates into the adhesive and subsequent reaction, the isocyanate-functional polyurethane prepolymers cure under atmosphere conditions. The obtained adhesive product is a crosslinked material held together primarily through urea groups and urethane groups. Reactive hot-melt adhesives based on isocyanate-functional polyurethane prepolymers are described for example by H. F. Hüber and H. Müller in "Shaping Reactive Hotmelts Using LMW Copolyesters", Adhesives Age, November 1987, pages 32 to 35.

It has now been discovered that by using the (meth) acrylate polymers as defined herein, the cured adhesive based on the reactive hot melt adhesives in the present invention possess significantly low bonding strength at elevated temperature as well as high bonding strength at room temperature for a variety of common substrates. As such, the cured adhesives according to the present invention are capable of an easy removability basically without any adhesive residue left on the substrate to be reused. In addition, the cured adhesives according to the present invention have good anti-aging performance for different types of substrates. The reactive hot melt adhesive in the present invention also possess a medium viscosity and thus is convenient for application.

The reactive hot melt polyurethane adhesives of the present invention may be prepared by mixing the (meth) acrylate polymer with a polyol and an isocyanate at a temperature of from about 60° C. to about 150° C. Moisture is typically excluded from the reaction using dry chemicals and conducting the reaction under vacuum or the presence of an anhydrous gas blanket. The isocyanate-functional polyurethane prepolymers which are conventionally produced from polyols and isocyanates react with surface or ambient moisture in order to extent the backbone and thus form a polyurethane polymer. Through the diffusion of moisture from the atmosphere or the substrates into the adhesive and subsequent reaction, the isocyanate-functional polyurethane prepolymers cure under atmosphere conditions. The obtained adhesive product is a crosslinked material held together primarily through urea groups and urethane groups. Suitable polyurethane reactive hot melt adhesives for bonding various materials in HHDD manufacturing field are already known. In one embodiment, the amount of the isocyanate-functional polyurethane prepolymer in the hot melt adhesive of the present invention is from about 60 to about 90% by weight, preferably from about 65 to about 85% by weight, more preferably from about 70 to about 85% by weight, still more preferably from about 75 to about 85% by weight, based on the total weight of reactive hot melt adhesive.

Any suitable compound, which contains two or more isocyanate groups, may be used for preparing the isocyanate-functional polyurethane prepolymers of this invention. Typically from about 0.1 to about 90% by weight and preferably from about 0.1 to about 30% by weight of NCO-content based on the weight of the isocyanate-functional polyurethane prepolymer is used in the present invention.

Organic polyisocyanates, which may be used to practice the invention, include alkylene diisocyanates, cycloalkylene diisocyanates, aromatic diisocyanates and aliphatic-aromatic diisocyanates. Specific examples of suitable isocyanate-containing compounds include, but are not limited to, ethylene diisocyanate, ethylidene diisocyanate, propylene diisocyanate, butylene diisocyanate, trimethylene diisocyanate, hexamethylene diisocyanate, toluene diisocyanate, cyclopentylene-1,3-diisocyanate, cyclo-hexylene-1,4-diisocyanate, cyclohexylene-1,2-diisocyanate, 4,4'-diphenylmethane diisocyanate, 2,2-diphenylpropane-4,4'-diisocyanate, xylylene diisocyanate, 1,4-naphthylene diisocyanate, 1,5-naphthylene diisocyanate, m-phenylene diisocyanate, p-phenylene diisocyanate, diphenyl-4,4'-diisocyanate, azobenzene-4,4'-diisocyanate, diphenylsulphone-4,4'-diisocyanate, 2,4-tolylene diisocyanate, dichlorohexa-methylene diisocyanate, furfurylidene diisocyanate, 1-chlorobenzene-2,4-diisocyanate, 4,4',4"-triisocyanatotriphenylmethane, 1,3,5-triisocyanato-benzene, 2,4,6-triisocyanato-toluene, 4,4'-dimethyldiphenyl-methane-2,2',5,5-tetratetraisocyanate, and the like. While such compounds are commercially available, methods for synthesizing such compounds are well known in the art. Preferred isocyanate-containing compounds are methylenebisphenyldiisocyanate (MDI) and its polymeric analog as described in "The Polyurethanes Book", D. Randall and S. Lee, eds., John Wiley & Sons, 2002, page 84, isophoronediisocyanate (IPDI), hydrogenated methylenebisphenyldiisocyanate (HMDI) and toluene diisocyanate (TDI).

The polyisocyanate may be reacted in excess with a polyol with regard to the molar NCO:OH ratio to produce an isocyanate-functional PU prepolymer. By selection of the molar NCO:OH ratio it is possible to control the molecular weight and the amount of reactive NCO groups in the prepolymer. In one embodiment, the molar ratio of NCO groups in the polyisocyanates to OH groups in the polyols is more than 1:1, preferably from 1.8 to 2.2, more preferably from 1.9 to 2.1.

In the present invention, the polyols react with isocyanate to produce an isocyanate-functional polyurethane prepolymer. The polyols are typically used in an amount of from 20% to about 80% by weight, more preferably from about 30% to about 60% by weight, still more preferably from about 40% to about 50% by weight and reacts with an excess of reactive isocyanate equivalents. Embodiments of this invention containing nonfunctional acrylic block copolymers preferably contain one or more polyols. In this instance the prepolymer is prepared by the polymerization of a polyisocyanate with one or more polyols, most preferably a diisocyanate with a diol, where the (meth)acrylate polymer is preferably present in the mixing vessel, however can optionally be blended prior to or after prepolymer formation. Adhesives with the (meth)acrylate polymer optionally contain one or more polyol components that can be introduced prior, during, or post reaction of the (meth)acrylate polymer and isocyanate components. The polyols used include polyhydroxy ethers (substituted or unsubstituted polyalkylene ether glycols or polyhydroxy polyalkylene ethers), polyhydroxy polyesters, the ethylene or propylene oxide adducts of polyols and the monosubstituted esters of glycerol, and "polymer polyols" (i.e., graft polyols containing a proportion of a vinyl monomer, polymerized in situ, e.g., Niax Polyol 34-28) as well as mixtures thereof. While such compounds are commercially available, methods for synthesizing such compounds are well known in the art. In one embodiment of the present invention, the polyols are selected from polyester polyols, polyether polyol, and combination thereof.

Suitable polyether polyols include linear and/or branched polyethers having plural numbers of ether bonds and at least two hydroxyl groups, and contain substantially no functional group other than the hydroxyl groups. Examples of the polyether polyol may include polyoxyalkylene polyol such as polyethylene glycol, polypropylene glycol, polytetramethylene glycol, polybutylene glycol and the like. Further, a homopolymer and a copolymer of the polyoxyalkylene polyols or mixtures thereof may also be employed. Particularly preferable copolymers of the polyoxyalkylene polyols may include an adduct of at least one compound selected from the group consisting of ethylene glycol, propylene glycol, diethylene glycol, dipropylene glycol, triethylene glycol, 2-ethylhexanediol-1,3,glycerin, 1,2,6-hexane triol, trimethylol propane, trimethylol ethane, tris(hydroxyphenyl)propane, triethanolamine, triisopropanolamine; with at least one compound selected from the group consisting of ethylene oxide, propylene oxide and butylene oxide. While such compounds are commercially available, methods for synthesizing such compounds are well known in the art. Non-limiting examples of commercially available polyols which may be used in the practice of the invention include polyethers such as N240 (Shanghai Gao Qiao Petrochemical Co., Ltd.), ARCOL PPG 2025 (Bayer), PolyG 20-56 (Arch) and Pluracol P-2010 (BASF).

Suitable polyester polyols are formed from the condensation of one or more polyhydric alcohols having from about 2 to about 15 carbon atoms with one or more polycarboxylic acids having from about 2 to about 14 carbon atoms. Examples of suitable polyhydric alcohols include ethylene glycol, propylene glycol such as 1,2-propylene glycol and 1,3-propylene glycol, glycerol, pentaerythritol, trimethylolpropane, 1,4,6-octanetriol, butanediol, pentanediol, hexanediol, dodecanediol, octanediol, chloropentanediol, glycerol monallyl ether, glycerol monoethyl ether, diethylene glycol, 2-ethylhexanediol, 1,4-cyclohexanediol, 1,2,6-hexanetriol, 1,3,5-hexanetriol, 1,3-bis-(2-hydroxyethoxy)propane and the like. While such compounds are commercially available, methods for synthesizing such compounds are well known in the art. Commercially available semicrystalline polyester polyols useful in the invention include, for example, Dynacoll 7130, 7240, and 7360 (Creanova), Fomrez 66-32 (Crompton) and Rucoflex S-105-30 (Bayer). Examples of polycarboxylic acids include phthalic acid, isophthalic acid, terephthalic acid, tetrachlorophthalic acid, maleic acid, dodecylmaleic acid, octadecenylmaleic acid, fumaric acid, aconitic acid, trimellitic acid, 3,3'-thiodipropionic acid, succinic acid, adipic acid, malonic acid, glutaric acid, pimelic acid, sebacic acid, cyclohexane-1,2-dicarboxylic acid, 1,4-cyclohexadiene-1,2-dicarboxylic acid, 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Preferred polycarboxylic acids are the aliphatic and cycloaliphatic dicarboxylic acids containing about 14 or less carbon atoms and the aromatic dicarboxylic acids containing about 14 or less carbon atoms.

Generally, there is no limitation for the selection of polyols and polycarboxylic acids to be used in the present invention, as long as they are compatible with other optional components, and do not have a negative effect on the desired properties of the adhesive, e.g. the low bonding strength at elevated temperature as well as high bonding strength at room temperature etc. Of course, the PU prepolymers produced from the reactants are required to be compatible with the (meth)acrylate polymer used in the present invention. As used herein, the term "compatible" means that the components comprised in the hot melt adhesive form a stable multiphase morphology wherein the phases do not significantly coalesce and/or increase in size upon aging at temperatures at or above the glass transition temperature (Tg) of the materials.

Another component contained in the composition of the hot melt adhesive includes (meth)acrylate polymers having a melting point of from about 90 to about 140° C., and a number average molecular weight of from about 20000 to about 80000 g/mol. The term "(meth)acrylate" refers to methacrylate or acrylate both. In one embodiment, the (meth)acrylate polymers are copolymers. They include polymerisates of esters of (meth)acrylic acids and as comonomer virtually any ethylenically unsaturated comonomer which is polymerizable with such (meth)acrylates including (meth)acrylates.

(Meth)acrylates, optionally together with comonomers, may be polymerised so as to produce a wide range of Tg values, as from about −20° C. and 105° C., preferably from 15° C. to 85° C. (measured according to ISO 11357-2). Suitable (meth)acrylates or acrylic comonomers, respectively, include the C1 to C12 esters of methacrylic and acrylic acids selected the group consisting of methyl methacrylate, ethyl methacrylate, n-propyl, iso-propyl methacrylate, n-butyl methacrylate, isobutyl methacrylate, n-hexyl methacrylate, n-octyl methacrylate 2-ethylhexyl methacrylate, dodecyl methacrylate or the corresponding acrylates. Mixtures of (meth)acrylate monomers may also be used. Methacrylic and acrylic comonomers based on esters of methacrylic and acrylic acid with poly(ethylene glycol) and/or poly(propylene glycol and/or glycol ethers may also be used. Other additional vinyl comonomers that may be used include the vinyl esters (e.g. vinyl acetate and vinyl propionate); vinyl ethers; esters of crotonic acid, maleic acid, fumaric acid and itaconic acid; styrene; alkyl styrene; acrylonitrile; butadiene; etc. as well as comonomers thereof. The particular monomers selected will depend, in large part, upon the end use for which the adhesives are intended. In the present invention, the (meth)acrylate polymers are essentially non-reactive to the isocyanate through NCO-groups. The term "essentially non-reactive" refers to that less than 1%, preferably less than 0.5%, more preferably less than 0.1% by weight of the (meth)acrylate polymers based on the total weight of reactive hot melt adhesive are capable of reacting with NCO-groups during the process of preparing the hot melt adhesive according to the present invention. Preferably, the (meth)acrylate polymers are completely non-reactive to the isocyanate. In other words, the (meth)acrylate polymers of present invention preferably do not comprise monomers with functional groups selected from OH—, SH—, COOH—, NH— that react with isocyanate and participate in formation of the urethane prepolymer. In one embodiment, the monomers forming the (meth)acrylate polymer in the present invention are selected from the group consisting of methyl methacrylate, ethyl methacrylate, propyl methacrylate, butyl methacrylate, hexyl methacrylate, octyl methacrylate, 2-ethylhexyl methacrylate, dodecyl methacrylate and combination thereof. Preferably, the monomers forming the (meth)acrylate polymer are methyl methacrylate and butyl methacrylate.

In particular, the (meth)acrylate polymer used in the present invention has a melting point of from about 90 to about 140° C., and a number average molecular weight of from about 20000 to about 80000 g/mol.

Preferably, the (meth)acrylate polymer according to the present invention has a number average molecular weight of from about 25000 to about 60000 g/mol, preferably from about 30000 to about 50000 g/mol as measured by GPC according to EN ISO 13885, using a polystyrene standard for calibration.

Preferably, the (meth)acrylate polymer according to the present invention has melting point of from about 95 to about 130° C. according to DIN EN ISO 11357.

In a preferred embodiment, the (meth)acrylate polymer according to the present invention is selected from a copolymerization product of butyl acrylate and methyl methacrylate as comonomers having a melting point about 100° C. and a number average molecular weight about 30000 g/mol; a copolymerization product of butyl acrylate and methyl methacrylate as comonomers having a melting point about 120° C. and a number average molecular weight about 50000 g/mol; a copolymerization product of butyl methacrylate and methyl methacrylate as comonomers having a melting point about 110° C. and a number average molecular weight about 60000 g/mol, and combination thereof.

In another preferred embodiment, the amount of the (meth)acrylate polymer is from about 5% to about 40% by weight, preferably from about 10% to about 30% by weight, based on the total weight of reactive hot melt adhesive.

Other additives inert to the other components comprised in the hot melt adhesive according to the present invention and conventionally used in the art of hot melt adhesives to satisfy different properties and meet specific application requirements can optionally be included from 0% by weight to about 20% by weight in the hot melt adhesive of this invention. Such additives include, for example, diluents, plasticizers, fillers, pigments, curing catalysts, dissociation catalysts, anti-oxidants, flow modifiers, dyestuffs, flame retardants, inhibitors, UV absorbers, adhesion promoters, stabilizers, thermoplastic polymers, tackifiers and waxes which may be incorporated in minor or larger amounts into the adhesive formulation, depending on the purpose.

The reactive hot melt adhesive of the present invention optionally contains from 0 to about 50% by weight a thermoplastic polymer which cooperates with the other adhesive components to provide the desired properties of the present hot melt adhesives. The thermoplastic polymer according to the invention is different from the (meth)acrylate polymer having a melting point of from 90 to 140° C., and a number average molecular weight of from 20000 to 80000 g/mol according to the invention and different from the isocyanate-functional polyurethane prepolymer according to the invention. Preferably, the thermoplastic polymer composition is selected to be of similar polarity and compatible with the urethane components, the (meth)acrylate polymer, and other optional components like tackifiers or diluents. The preferred optional thermoplastic copolymer components of this invention include homopolymers or random copolymers of olefinic monomers including but not limited to, acrylic acid, methacrylic acid, vinyl esters (vinyl acetate and vinyl propionate), vinyl ethers, styrene, acrylamides, methacrylamides, fumarates, maleates, acrylonitrile, ethylene, propylene and derivatives thereof. Most preferred are homopolymers or random copolymers of ethylene, propylene and derivatives thereof. In one embodiment, the hot melt adhesive in the present invention further comprises homopolymers or random copolymers of ethylene and propylene, such as MODIC series, made by Mitsubishi Petrochemical Company, Ltd., such as maleic anhydride-modified polyethylene, under the trade name of MODIC L100F, and maleic anhydride-modified polypropylene, under the trade name of MODIC P-10B, made by Mitsubishi Petrochemical Company, Ltd.

The hot melt adhesives of this invention optionally comprise a tackifier in an amount of from 0% by weight to about 80% by weight, more preferably from about 10% by weight to about 50% by weight, even more preferably from about 20% by weight to about 40% by weight. The tackifying resins normally have ring and ball softening points as determined by ASTM method E28-58T between about 70° C. and 150° C., more preferably between about 80° C. and 120° C., and most preferably between about 90° C. and 110° C. Mixtures of two or more of the below described tackifying resins may be required for some formulations.

Useful tackifiers include any compatible resins or mixtures thereof such as (1) natural or modified rosins such, for example, as gum rosin, wood rosin, tall-oil rosin, distilled rosin, hydrogenated rosin, dimerized rosin, and polymerized rosin; (2) glycerol and pentaerythritol esters of natural or modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, e.g., styrene/terpene and alpha methyl styrene/terpene; (4) polyterpene resins having a softening point, as determined by ASTM method E28-58T, of from about 80° C. to 150° C.; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof, for example, as the resin product resulting from the condensation, in an acidic medium, of a bicyclic terpene and phenol; (6) aliphatic petroleum hydrocarbon resins having a Ball and Ring softening point of from about 70° C. to 135° C. according to ISO 4625-1-2004; the latter resins resulting from the polymerization of monomers consisting of primarily of olefins and diolefins; also included are the hydrogenated aliphatic petroleum hydrocarbon resins; (7) alicyclic petroleum hydrocarbon resins and the hydrogenated derivatives thereof; (8) aliphatic/aromatic or cycloaliphatic/aromatic copolymers and their hydrogenated derivatives; and (9) aromatic resins.

The desirability and selection of the particular tackifying agent is, in large part, dependent upon the specific block copolymer employed.

Preferred tackifiers are synthetic hydrocarbon resins. Non-limiting examples include aliphatic olefin derived resins such as those available from Goodyear under the Wingtack® trade name and the Escorez® 1300 series from Exxon. A common C5 tackifying resin in this class is a diene-olefin copolymer of piperylene and 2-methyl-2-butene having a softening point of about 95° C. This resin is available commercially under the trade name Wingtack 95. Most preferable are aromatic hydrocarbon resins that are C9 aromatic/aliphatic olefin-derived and available from Startomer and Cray Valley under the trade name Norsolene and from Rutgers series of TK aromatic hydrocarbon resins. Norsolene M1090 is a low molecular weight thermoplastic hydrocarbon polymer where the aliphatic portion is derived largely from alpha-pinene which has a ring and ball softening point of 95 to 105° C. and is commercially available from Cray Valley. These C9 based hydrocarbon resins are particularly useful when synthesized with an alpha-pinene, styrene, terpene, alpha-methylstyrene, and/or vinyl toluene, and polymers, copolymers and terpolymers thereof, terpenes, terpene phenolics, modified terpenes, and combinations thereof. The increased aromatic structure of these resins produce more polar character in the resins that contributes toward the desired compatibility and performance of the adhesives of this invention. One examples of commercially available aromatic tackifier is KRISTALEX 3100, a low molecular weight thermoplastic hydrocarbon polymer derived largely from alphamethylstryene which has a Ring and Ball softening point of 97° C. to 103° C. available from Eastman.

The hot melt adhesives of this invention optionally comprise a catalyst in an amount of from 0.1% by weight to about 2% by weight, more preferably from about 0.3% by weight to about 0.8% by weight, based on the total weight of the hot melt adhesive. The optional catalysts may accelerate the formation of the isocyanate-functional polyurethane prepolymer during its production and/or the moisture curing/crosslinking process after application of the hot melt adhesive. Suitable catalysts are the normal polyurethane catalysts such as, for example, compounds of divalent and tetravalent tin, more particularly the dicarboxylates of divalent tin and the dialkyl tin dicarboxylates and dialkoxylates. Examples of such catalysts are dibutyl tin dilaurate, dibutyl tin diacetate, dioctyl tin diacetate, dibutyl tin maleate, tin(II) octoate, tin(II) phenolate as well as the acetyl acetonates of divalent and tetravalent tin. The highly effective tertiary amines or amidines may also be used as catalysts, optionally in combination with the tin compounds mentioned above. Suitable amines are both acyclic and, in particular, cyclic compounds. Examples include tetramethyl butane diamine, bis-(dimethylaminoethyl)-ether, 1,4-diazabicyclooctane (DABCO), 1,8-diazabicyclo-(5.4.0)-undecane, 2,2'-dimorpholinodiethyl ether (DMDEE) or dimethyl piperazine or even mixtures of the amines mentioned above.

Although frequently no additional adhesion promoters are required, the abovementioned tackifying resins like abietic acid, terpene resins, terpene/phenol resins or hydrocarbon resins also act as adhesive promoters. Organofunctional silanes like the epoxy-functional 3-glycidyl-oxypropyl-trialkoxysilane or the isocyanate-functional isocyanatoethyl trisalkoxysilane, epoxy resins, melamine resins or phenolic resins may also be added as adhesion promoters.

While the choice of components, order of addition, and addition rate can be left to the skilled adhesives chemist, generally the reactive hot melt urethane adhesives of this invention can be made by preparing the (meth)acrylate polymer and the polyol and blending any optional ingredients such as thermoplastic polymer, adhesion promoter or tackifier, if necessary, into a suitable reaction vessel at elevated temperatures, typically in the range of about 60° C. to about 150° C., preferably about 80° C. to about 120° C. The isocyanate is then introduced into the reaction vessel at elevated reaction temperatures, typically in the range of about 80° C. to about 130° C. Moisture is typically excluded from reaction using dry chemicals and conducting the reaction under vacuum or the presence of an anhydrous gas blanket.

In one embodiment, the viscosity of the hot melt adhesive in the present invention at 100° C. is from 2000 to 20000 mPas, preferably from 2500 to 10000, more preferably from 3000 to 5000, measured according to EN ISO 2555 by Brookfield Digital Viscometer RVT using spindle 27 at 10 rpm.

The invention also provides a method for bonding articles together which comprises applying the reactive hot melt adhesive of the present invention in a liquid melt form to a first article, bringing a second article in contact with the composition applied to the first article, and subjecting the applied adhesive to moisture which will allow the composition to cool and cure to a solid form. The composition is typically distributed and stored in its solid form, and is stored in the absence of moisture. When the composition is ready for use, the solid is heated and melted prior to application. Thus, this invention includes reactive polyurethane hot melt adhesives in both its solid form, as it is typically to be stored and distributed, and its liquid form, after it has been melted, just prior to its application.

After application, to adhere articles together, the reactive hot melt adhesive is subjected to conditions that will allow it to solidify and cure to a composition that has an irreversible solid form. Irreversible solid form means a solid form comprising polyurethane polymers extended from the aforementioned isocyanate-functional polyurethane prepolymers. The composition having the irreversible solid form typically can withstand temperatures of up to 150° C. Solidification (setting) occurs when the molten hot melt adhesive is cooled by subjected to room temperature. The reactive hot melt adhesives of the invention can be cured to an irreversible solid form in the bond line using a variety of mechanisms. The curing reaction occurs between a compound having an available active hydrogen atom and the NCO groups of the polyurethane precursor. A variety of reactive compounds having free active hydrogens are known in the art including water, hydrogen sulfide, polyols, ammonia, and other active compounds. The preferred curing reaction of this invention relies on the presence of ambient moisture. In one embodiment, provided herein is a cured adhesive obtained from the reactive hot melt adhesive according to the present invention.

The reactive hot melt adhesive and the cured adhesive can be used for bonding articles having substrates made of wood, metal, polymeric plastics, glass and textiles; in water towers, for bonding to exterior surfaces, in the manufacture of footwear, as a glazing compound in the manufacture of windows, in the manufacture of doors and architectural panels, and in the manufacture of the handheld devices and displays (HHDD). In one embodiment, the reactive hot melt adhesive and the cured adhesive according to the present invention are used in handheld devices and displays.

EXAMPLES

In the examples that follow, the following tests were used to determine viscosity, bonding strength and removability.

Testing Methods

Viscosity:

Brookfield Digital Viscometer RVT with Thermosel heating unit, using spindle 27, at 100° C., at 10 rpm, according to EN ISO 2555.

The values of bonding strength of the assembled parts (stainless steel to glass; plastics made of PC and ABS (PC/ABS) to glass; and PC/ABS to PC/ABS at room temperature were measured 24 hours after final curing according to conventional methods.

The values of bonding strength of the assembled parts (stainless steel to glass; PC/ABS to glass; and PC/ABS to PC/ABS) after aging were measured according to conventional methods.

Removability:

The removability of the hot melt adhesive according to the present invention (Examples A-C and E-I) and a conventional hot melt adhesive (Example D) was tested and evaluated according to the method consisting of the following steps:

1. Keep the substrates (assembly parts) bonded by the hot melt adhesives for 24 hours under indoor atmosphere conditions;
2. Place the bonded substrates into an oven heated to 80° C. for 20 minutes;
3. Detach the substrates and try to peel off the adhesive left on the substrate(s) by hand immediately after removing the substrates from the oven; and
4. Evaluate the removability by the following scales:

"GOOD" means that the adhesive residue was completely peeled off from the substrates, and "POOR" means that most of the adhesive residue could not be successfully peeled off from the substrates and remained on the surface of the substrates.

Materials

Isocyanate:

4,4'-MDI: a commercial product under the trade name of 44C from Bayer.

(Meth)acrylate polymer 1:

A copolymerization product of butyl acrylate and methyl methacrylate as comonomers Melting point: about 100° C.

Number average molecular weight: about 30000 g/mol.

(Meth)acrylate polymer 2:

A copolymerization product of butyl acrylate and methyl methacrylate as comonomers Melting point: about 120° C.

Number average molecular weight: about 50000 g/mol.

(Meth)acrylate polymer 3:

A copolymerization product of butyl methacrylate and methyl methacrylate as comonomers Melting point: about 110° C.

Number average molecular weight: about 60000 g/mol.

Polyols:

Polyester Polyol 1:

Dynacoll 7130; a commercial product comprising diethylene glycol, 1,2-propylene glycol and adipic acid from Creanova.

Polyester Polyol 2:

Dynacoll 7240; a commercial product comprising neopentyl glycol and phthalic anhydride, 2-methyl-1,3-propanediol and isophthalic acid from Creanova.

Polyether Polyol:

N240, a commercial product comprising ethylene glycol and diethylene glycol from Shanghai Gao Qiao Petrochemical Co., Ltd.

Catalyst:

2,2'-dimorpholinodiethyl ether (DMDEE): a commercial product under the trade name of Lupragen® N106 from BASF SE.

Adhesive Promoter:

3-aminopropyltriethoxysilane: a commercial product under the trade name of XIAMETER® OFS-6011 from Dow Corning.

Thermoplastic Polymer:

A maleic anhydride-modified polyethylene: a commercial product under the trade name of MODIC L100F from Mitsubishi Petrochemical Company, Ltd.

Preparation:

Reactive hot melt adhesives having the formulations shown in Table 1 (by weight) according to the present invention were prepared as Examples A-C, and E-I. In the preparation, all the polyols and (meth)acrylate polymers were added to melt and mix under vacuum until homogeneous and free of moisture. Then MDI was added and polymerization allowed to proceed with mixing under vacuum at 100° C. until reaction is complete after one hour. Finally, additives were added, and the resulting mixture was stirred at 100° C. for 10 minutes. The resulting reactive hot melt adhesive was then placed into a container under a dry nitrogen headspace to prevent exposure to moisture. A comparative example representing conventional reactive hot melt technology without (meth)acrylate polymer was prepared by the same process and is referred as Example D.

Over a period of time after bonding, the bonding strength of assembled parts at room temperature, the bonding strength of assembled parts at an elevated temperature, removability, and anti-aging performance were tested and the results are listed in Tables 2 and 3.

TABLE 1

Formulations of Examples A-I

|  | Example A | Example B | Example C | Example D | Example E | Example F | Example G | Example H | Example I |
|---|---|---|---|---|---|---|---|---|---|
| Polyether polyol | 44.0 | 44.0 | 44.0 | 64.0 | 44.0 | 44.0 | 44.0 | 64.0 | 64.0 |
| (meth)acrylate polymer 1 | 64.2 | 59.1 | 50.5 | — | — | — | — | — | — |
| (meth)acrylate polymer 2 | — | — | — | — | 63.2 | 62.4 | 61.7 | — | — |
| (meth)acrylate polymer 3 | — | — | — | — | — | — | — | 69.1 | 39.1 |
| Polyester polyol 1 | 128.6 | 128.6 | 128.6 | 128.6 | — | — | — | — | — |
| Polyester polyol 2 | — | — | — | — | 128.6 | 128.6 | 128.6 | 128.6 | 128.6 |
| Isocyanate | 42.3 | 42.3 | 42.3 | 42.3 | 42.3 | 40.9 | 40.5 | 42.3 | 42.3 |
| Catalyst | 0.3 | 0.3 | 0.3 | 0.3 | 0.3 | 0.3 | 0.3 | 0.3 | 0.3 |
| Adhesion promoter | 1.5 | 1.5 | 1.5 | 1 | 1.5 | 1 | 1 | 1.5 | 1.5 |
| Thermoplastic polymer | — | — | — | — | 1.0 | 1.8 | 2.5 | — | — |
| Viscosity (cps @ 100° C., averaged) | 3700 | 3900 | 4000 | 4200 | 4200 | 4600 | 4900 | 4550 | 4200 |

TABLE 2

Bonding strength of assembled parts at room temperature

|  | Example A | Example B | Example C | Example D | Example E | Example F | Example G | Example H | Example I |
|---|---|---|---|---|---|---|---|---|---|
| Stainless Steel-Glass (MPa) | 6.5 | 6.1 | 5.3 | 5.1 | 6.1 | 6.0 | 5.7 | 6.9 | 5.8 |
| PC/ABS-Glass (MPa) | 6.1 | 5.8 | 5.1 | 4.8 | 6.3 | 5.2 | 5.6 | 5.3 | 5.4 |
| Stainless Steel-Glass after 7 days 85° C., 85% RH aging | 5.9 | 5.8 | 5.1 | 4.9 | 5.7 | 5.5 | 5.1 | 5.7 | 5.2 |

TABLE 3

Bonding strength of assembled parts at an elevated temperature and removability

|  | Example A | Example B | Example C | Example D | Example E | Example F | Example G | Example H | Example I |
|---|---|---|---|---|---|---|---|---|---|
| PC/ABS-Stainless Steel at 70-90° C. (MPa) | 0.80 | 0.73 | 0.71 | 1.58 | 0.78 | 0.75 | 0.73 | 0.76 | 0.82 |
| Removability | GOOD | GOOD | GOOD | POOR | GOOD | GOOD | GOOD | GOOD | GOOD |
| PC/ABS-PC/ABS at 70-90° C. (MPa) | 0.78 | 0.71 | 0.66 | 1.69 | 0.79 | 0.76 | 0.69 | 0.71 | 0.79 |
| Removability | GOOD | GOOD | GOOD | POOR | GOOD | GOOD | GOOD | GOOD | GOOD |

The results of viscosity of the resulting PU hot melt adhesives in Table 1 show that all of the adhesive examples according to the present invention are easy to apply and thus suitable for the use in part assembly.

It can be seen from Table 2 that all of the adhesive examples according to the present invention exhibit good bonding strength for the combinations of same or different type of substrate. The assembly parts can be firmly attached by such bonding strength at room temperature. In addition, compared to Example D, the inventive examples each possess better bonding strength at room temperature in each case.

As shown in Table 3, it can be surprisingly found that each of the bonding strength values at an elevated temperature of adhesive examples according to the present invention are significantly lower than that of Example D, which does not contain the specific (meth)acrylate used in the present invention. Accordingly, each of the adhesive examples according to the present invention possess better removability than that of the comparative Example D.

In addition, it can be found in Tables 2 and 3 that even after aging, the values of bonding strength at room temperature and elevated temperature of the adhesives according to the present invention are only slightly decreased, which demonstrates a good stability after storing over a long term.

Therefore, all these results demonstrate that with respect to the hot melt adhesive having specifically selected (meth) acrylates according to the present invention, the following advantages of property can be achieved: a high bonding strength at room temperature, a significantly low bonding strength at an elevated temperature, an appropriate viscosity for application, a good stability for long term using, an convenient application method and a versatile process, especially in the field of handheld devices and displays.

The invention claimed is:

1. A removable reactive hot melt adhesive comprising a (meth)acrylate polymer and an isocyanate-functional polyurethane prepolymer, wherein the (meth)acrylate polymer has a number average molecular weight from about 25000 g/mol to about 60000 g/mol and is selected from a copolymerization product of butyl acrylate and methyl methacrylate as monomers having a melting point of from about 100° C. to about 120° C., a copolymerization product of butyl methacrylate and methyl methacrylate as monomers having a melting point about 110° C., and combinations thereof; and
   wherein the cured adhesive has a bond strength of about 5.0 MPa or greater at room temperature and a bond strength of about 0.8 MPa or less at a temperature of about 70° C. to about 90° C.

2. The reactive hot melt adhesive according to claim 1, wherein the amount of the (meth)acrylate polymer is from 5 to 40% by weight, based on the total weight of reactive hot melt adhesive.

3. The reactive hot melt adhesive according to claim 1, wherein the amount of the (meth)acrylate polymer is from 10 to 30% by weight, based on the total weight of reactive hot melt adhesive.

4. The reactive hot melt adhesive according to claim 1, wherein the isocyanate-functional polyurethane prepolymer is a reaction product of the reactants comprising one or more polyisocyanates and one or more polyols, wherein the molar ratio of NCO groups in the polyisocyanates to OH groups in the polyols is more than 1:1.

5. The reactive hot melt adhesive according to claim 1, wherein the isocyanate-functional polyurethane prepolymer is a reaction product of the reactants comprising one or more polyisocyanates and one or more polyols, wherein the molar ratio of NCO groups in the polyisocyanates to OH groups in the polyols is from 1.9:1 to 2.1:1.

6. The reactive hot melt adhesive according to claim 1, wherein the polyols are selected from polyester polyols, polyether polyols, and combination thereof.

7. The reactive hot melt adhesive according to claim 1, wherein the amount of the isocyanate-functional polyurethane prepolymer is from 60 to 90% by weight, based on the total weight of reactive hot melt adhesive.

8. The reactive hot melt adhesive according to claim 1, wherein the amount of the isocyanate-functional polyurethane prepolymer is from 65 to 85% by weight, based on the total weight of reactive hot melt adhesive.

9. The reactive hot melt adhesive according to claim 1, wherein the adhesive further comprises at least one additive selected from the group consisting of diluents, plasticizers, fillers, pigments, curing catalysts, dissociation catalysts, anti-oxidants, flow modifiers, dyestuffs, flame retardants, inhibitors, UV absorbers, adhesion promoters, stabilizers, thermoplastic polymers, tackifiers and waxes.

10. The reactive hot melt adhesive according to claim 1, wherein the adhesive further comprises tackifier including any compatible resins or mixtures selected from the group consisting of natural or modified rosins; glycerol and peritaerythritol esters of natural or modified rosins; copolymers and homopolymers of natural or modified terpenes and aromatic monomers, phenol and hydrogenated derivatives thereof; aliphatic petroleum hydrocarbon and hydrogenated derivatives thereof alicyclic petroleum hydrocarbon resins and the hydrogenated derivatives thereof; aliphatic/aromatic or cycloaliphatic/aromatic copolymers and their hydrogenated derivatives; and aromatic resins.

11. The reactive hot melt adhesive according to claim 1, wherein the adhesive further comprises a thermoplastic polymer comprising one or more homopolymer or random copolymer of any olefinic monomers.

12. The reactive hot melt adhesive according to claim 1, wherein the viscosity of the adhesive is from 2000 to 20000 mPas at 100° C., measured according to EN ISO 2555 by Brookfield Digital Viscometer RVT using spindle 27 at 10 rpm.

13. Cured reaction products of the adhesive of claim 1.

14. The reactive hot melt adhesive according to claim 1, wherein the adhesive further comprises a thermoplastic polymer comprising maleic anhydride-modified polyethylene, maleic anhydride-modified polypropylene, or a combination thereof.

15. An article comprising substrates bonded together by cured reaction products of the adhesive of claim 1.

16. A removable reactive hot melt adhesive comprising an isocyanate-functional polyurethane prepolymer; at least one (meth)acrylate polymer having a number average molecular weight from about 25000 g/mol to about 60000 g/mol and a melting point of from about 90° C. to about 120° C.; and optionally at least one additive selected from the group consisting of diluent, plasticizer, filler, pigment, curing catalyst, dissociation catalyst, anti-oxidant, flow modifier, dye, flame retardant, inhibitor, UV absorber, adhesion promoter, a homopolymer or random copolymer of any olefinic monomers, stabilizer, tackifiers and waxes;
   wherein the removable reactive hot melt adhesive is free from (meth)acrylate polymers having a melting point greater than 120° C. and cured products of the adhesive have a bond strength of about 5.0 MPa or greater at room temperature and a bond strength of about 0.8 MPa or less at a temperature of about 70° C. to about 90° C.

17. A removable reactive hot melt adhesive consisting of an isocyanate-functional polyurethane prepolymer; at least one (meth)acrylate polymer having a number average molecular weight from about 25000 g/mol to about 60000 g/mol and a melting point of from about 90° C. to about 120° C.; and optionally at least one additive selected from the group consisting of diluent, plasticizer, filler, pigment, curing catalyst, dissociation catalyst, anti-oxidant, flow modifier, dye, flame retardant, inhibitor, UV absorber, adhesion promoter, stabilizer, tackifiers and waxes;

wherein cured products of the adhesive have a bond strength of about 5.0 MPa or greater at room temperature and a bond strength of about 0.8 MPa or less at a temperature of about 70° C. to about 90° C.

\* \* \* \* \*